United States Patent [19]

Lautner et al.

[11] Patent Number: 5,051,632
[45] Date of Patent: Sep. 24, 1991

[54] ASSEMBLING ELECTRIC MOTORS WITH REDUCED END-PLAY

[75] Inventors: Max Lautner, Myrtle Beach, S.C.; Fred Hoffman, Chicago; Edward Melnikov, Des Plaines, both of Ill.

[73] Assignee: Uppco Incorporated, Chicago, Ill.

[21] Appl. No.: 550,806

[22] Filed: Jul. 10, 1990

Related U.S. Application Data

[60] Continuation of Ser. No. 343,004, Apr. 25, 1989, abandoned, which is a division of Ser. No. 246,364, Sep. 20, 1988, abandoned.

[51] Int. Cl.$^5$ .......................... H02K 15/16; H02K 5/26
[52] U.S. Cl. .......................... 310/42; 29/598; 310/49 R; 310/259
[58] Field of Search .................. 310/42, 49 R, 90, 259, 310/261; 29/596, 598

[56] References Cited

U.S. PATENT DOCUMENTS

| | | | |
|---|---|---|---|
| 4,164,674 | 8/1979 | Buckman et al. | 310/90 |
| 4,455,498 | 6/1984 | DeSisto | 310/42 |
| 4,818,910 | 4/1989 | Reisenweber | 310/42 |
| 4,878,289 | 11/1989 | Lautner et al. | 29/596 |

Primary Examiner—William H. Beha
Assistant Examiner—D. Rebsch
Attorney, Agent, or Firm—Laff, Whitesel, Conte & Saret

[57] ABSTRACT

A method of manufacturing fractional horsepower motors involves using each stator to customize the length of a rotor/shaft to match the thickness of the specific stator with which it will be used. This is accomplished by providing a fixture which receives the stator in a gauging position. The rotor/shaft, with a compressible member thereon, is placed on the fixture which is then closed over a distance fixed by the gage formed by the stator. As the fixture closes, a compressible member is compressed to exactly fit the length of the rotor/shaft assembly to the stator thickness. The compressible member is a preferably nylon or metal plug which is pushed into a metal cup and mounted at the end of the rotor as the fixture closes.

4 Claims, 1 Drawing Sheet

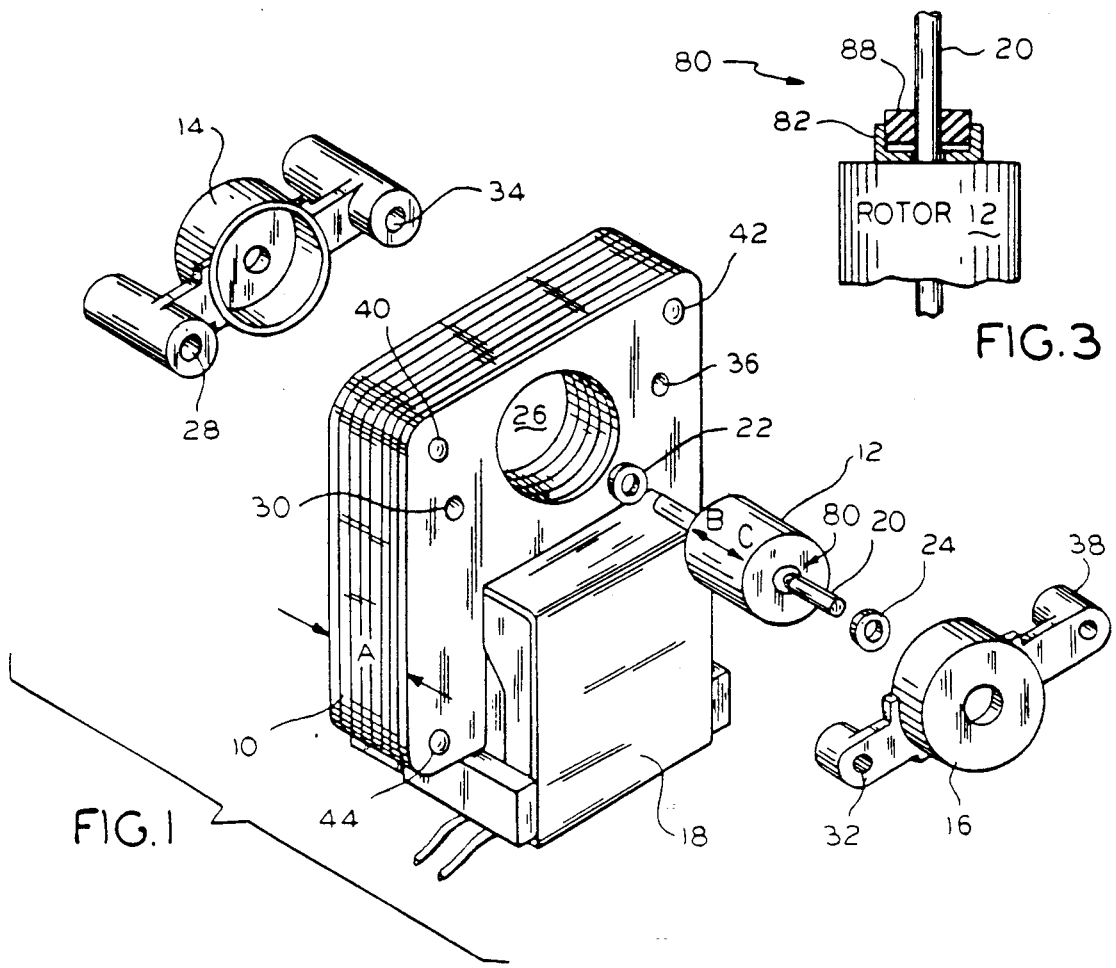
FIG. 3
FIG. 1
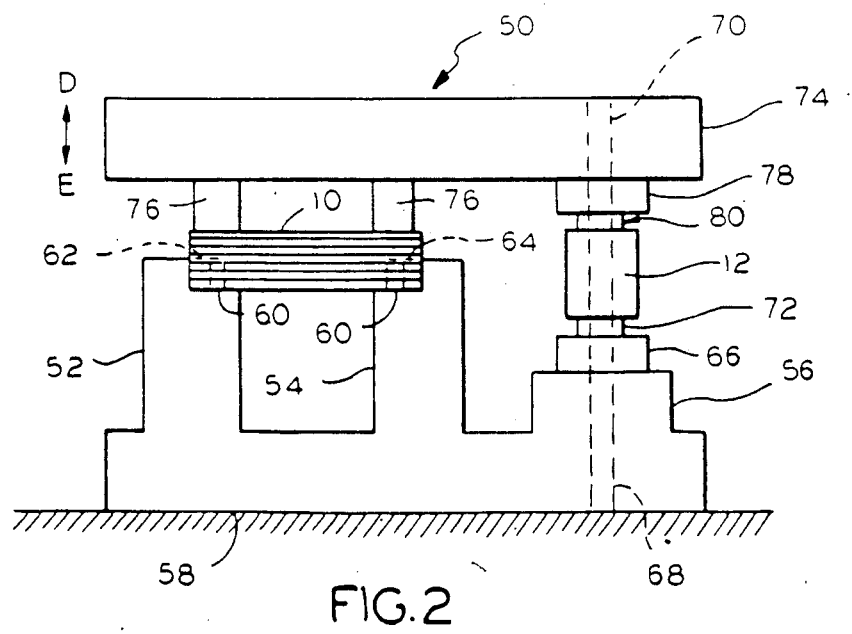
FIG. 2

ASSEMBLING ELECTRIC MOTORS WITH REDUCED END-PLAY

This application is a continuation of application Ser. No. 07/343,004, filed Apr. 25, 1989 now abandoned, which is a division of prior application Ser. No. 07/246,364, filed Sept. 20, 1988 now abandoned.

This invention relates to means for and methods of assembling electrical motors and more particularly to reducing end-play of rotors used in motors.

Electrical motors have rotors mounted on end bearings to turn within stators. "End-play" is the amount of axial movement of the rotor/shaft assembly in the motor as the shaft is displaced through the limits of its travel within the motor. The end-play results from the difference of the distances between the inner axial faces of the opposed end bearings of the motor and the distance across the rotor/shaft (including the spacers on the shaft). There must be some end-play in the end bearing in order for the rotation to occur.

In fractional horsepower motors, it becomes difficult to provide the desired amount of end play without a risk of providing too much or too little play, either of which might lead to improper operation or even total inoperativeness. If the end-play is inadequate, then the motor may not start and may overheat. If the end-play is too great, then the axial movement of the shaft of the rotor shaft assembly may cause an undue amount of wear and load upon the motor, even to the extent of improper operation.

Prior art methods for designing sleeve-bearing motors have entailed the establishment of nominal manufacturing dimensions and tolerances for all of the components of the motor which might have an effect upon the end-play. Thereafter, the dimensions across the rotor/shaft assembly and the spacers are calculated to determine a desired degree of end-play, when all dimensions are at their worst case and there is a combination of the most extreme limits of otherwise acceptable tolerances.

In a sleeve-bearing electric motor, the stator is the component which may have the greatest variations in tolerance since the stator is formed from a stack or series of laminates, each of which has a tolerance variation of its own. Therefore, the tolerance of the stator is the sum of the tolerances of all of the individual laminates which are stacked one on the other and then fastened together in order to form the stator. Of course, the tightness of the fastened stack also has an effect upon the total thickness tolerance. This variation in tolerance of the stator has been the cause of the greatest variance in the end-play in motors wherein the bearing supports are mounted on the stator.

The practice of the prior art has been to measure the thickness of the completed stator rather than to count the laminations. Then, the rotor is selected to fit those measurements. The prior art has found it extremely difficult to form a stator having a thickness tolerance of less than one-half of the thickness of a laminate. In this respect, it has not been uncommon for electric motors within a single production lot to have end-plays which vary from 0.001 inch to 0.060 inch. Therefore, there is a need to provide manufacturing means for and methods of reducing the variance in end-play.

Accordingly, an object of this invention is to provide new and improved means for and methods of manufacturing structures incorporating laminated parts. Here, an object is to adjust the length of each rotor/shaft assembly to conform with the length of each stator. In this connection, an object is to, in effect, customize each electric motor, in a mass-produced manner.

In keeping with an aspect of the invention, these and other objects are accomplished by a manufacturing jig or device for defining and fixing the end-play of a rotor/shaft assembly in an electric sleeve bearing motor. The device includes a first support for receiving and supporting a plurality of elements forming the stator and a second support for receiving and supporting the rotor/shaft assembly. A compression member is mounted on the shaft of the rotor and includes an element which has a thickness that is greater than is needed to fix the effective length of the rotor/stator assembly, whereby the compression element may be variably compressed to compensate for differences in the stator thickness. Thus, the stator may act as a gage for fixing the closing of a gap in the manufacturing jig or device at the support for the rotor/shaft assembly, thereby customizing the overall length of the rotor/stator to fit the specific stator that is used as a gage.

A preferred embodiment of the invention is shown in the attached drawings wherein:

FIG. 1 is a perspective and exploded view of an electric motor;

FIG. 2 is a side elevation, in cross-section, showing a device used in the manufacture of an electric motor; and FIG. 3 is a cross section showing the inventive compression member.

FIG. 1 shows the principal elements of an electric motor (especially a fractional horsepower motor) as including a stator 10, a rotor/shaft assembly 12, two end caps 14, 16, and a coil 18. The rotor 12 has a central shaft 20 which is supported on its two ends by end or sleeve bearings mounted in the end caps 14, 16. Spacers 22, 24 may be threaded over the shaft 20 on the opposite sides of the rotor 12. The assembly is made by placing rotor/shaft assembly 12 in a hole 26 in the stator, threading the spacers 22, 24 onto the ends of the shaft 20, fitting end caps 14, 16 with their sleeve bearings onto the ends of the shaft 20, and then passing two bolts or other fasteners (such as rivets) (not shown) through holes 28, 30, 32, and 34, 36, 38, respectively, to secure all parts into a completed motor.

The problem is that the thickness dimension of the entire assembly is fixed by the thickness A of the stator 10, since everything else in the motor is bolted to it. The stator is a laminate of steel plates which are more or less tightly held together by a plurality of rivets or weldments, three of which are seen at 40, 42, 44. Since nothing is perfect, every manufactured item must have some tolerance dimensions. Therefore, some of these steel laminate plates are thicker and some are thinner than the optimum thickness. Sometimes the rivets 40-44 clutch the plates more tightly and sometimes more loosely. Thus, the stator thickness dimension A is subject to great variance.

The rotor 12 must be loose enough to turn and, therefore, is subject to at least some degree of sliding back and forth in directions B, C, the freedom to slide being called "end-play". If the amount of end-play is too great, there is too much wear and may even be inoperativeness. If the amount of end-play is too small, there is binding and may also be inoperativeness. The trouble is that the limits of an acceptable amount of end-play is less than the necessary variations in the thickness A of the stator 10. Therefore, it is not possible to make a quality motor simply by inserting a rotor into a stator. As a result, the prior art has resorted to a number of "fix-it" approaches, such as hand sorting, in order to accommodate each rotor to its stator, on a more or less customized basis. This approach is expensive, leads to a great variation in performance, and may cause undesirable side effects such as noise, heating or the like.

In keeping with the invention, these problems are solved by using each stator itself as a gage in a manufacturing tool or jig. This gage is used in the process of manufacturing to customize the length of the rotor which is to be used with the particular stator that is actually used as its own gage.

In greater detail, as shown in FIG. 2, the inventive manufacturing apparatus 50 includes first and second support elements 52, 54, and 56, respectively, mounted on base member 58. First support elements 52, 54 contain a recess or support section 60, having pins 62, 64, for receiving and supporting a series of laminates which together form stator 10. The pins may pass into holes 30, 36 (FIG. 1), for example. The laminated stator 10 may be pre-assembled, and riveted together before it is placed in seat 60; or, the riveting may occur as parts 58, 74 move together.

Included on second support element 56 is an insert 66 which may have a thickness that is specific to a motor of a particular type or model. If production is switched to a different type of motor, another insert 66 may be substituted for this one, thereby accommodating rotor/shaft assemblies of different overall length. Both the second support element 56 and the insert 66 contain a central bore 68, 70 for receiving and supporting the shaft 20 (FIG. 1) of the rotor/shaft assembly 12. The lower surface of the rotor/shaft assembly may be supported on the insert 66 of the second support element 56 by steel cup washer assembly 72.

The apparatus 50 further includes a pressing member 74, which moves in directions D, E and which may be the upper jaw of a punch press, for example. Member 58 is the lower jaw of the punch press. A plurality of press bars or compression elements 76 are mounted on member 74 for pressing the laminates of stator 10 into support section 60 and for limiting the downward travel of member 74. That is, stator 10 acts as a gage for stopping the downward travel of press bars 76, 76, and therefore of member 74.

The pressing member 74 includes an insert 78 forming a contacting element for bearing against a plastic or metal sleeve compression member 80 which is disposed on at least one end of said shaft (here the upper surface of rotor 12, as viewed in FIG. 2). The pressing member 74 pushes down upon plastic or metal sleeve compression member 80 to compress it, and give the rotor 12 a length which corresponds to the travel of member 74 in order to customize the rotor length to the thickness of the stator 10. The stator 10 acts as a gage for stopping the downward travel and thus terminating the compression. Another insert member 78 may be substituted for that shown in FIG. 2 when a different type or model of motor is manufactured.

The construction of a preferred compression member 80 is shown in FIG. 3. The rotor 12 is built with a cup washer 82 in one end. A nylon plug 88, or a plug of a similar material, is fitted into the cup washer 82. Shaft 20 passes through aligned holes in the plug 88 and in the rotor 12. The plug 88 may be pushed any suitable distance into the cup washer where friction holds it in place. Thus, the overall length of the rotor is the length of rotor 12 plus the adjustable amount of the plug 88 which projects above the cup washer 82. That adjustable amount is, in turn, fixed by the thickness of the specific stator 10 in which the particular rotor/shaft assembly will be used.

In operation, a series of laminates forming stator 10 are placed upon support surface 60 of support members 52, 54. Thereafter, or concurrently therewith, shaft 20 of the rotor/shaft assembly 12 is placed into the holes 68, 70, with the compression member 80 including the steel cup washer 82 thereon. Subsequently, the pressing member 74 is lowered and a compressive force is applied to the plastic or metal plug member 88 to press it into sleeve 86 until laminates 62 of stator 10 are engaged by press bars 76. At this point the stator acts as a gage to stop the downward travel of part 74. The pressure applied against the plug 88 adjusts the total length of the rotor/shaft assembly 12 (including the plug) to exactly match the thickness A of the specific stator 10 in which the particular rotor/shaft 12 is used.

The invention has been described in connection with electric motors. However, the invention has utility for other applications where it is necessary to compensate for tolerance differences, such as end-play. Thus, those skilled in the art may make modifications to the disclosed apparatus without departing from the scope and spirit of the invention. Accordingly, the claims are to be construed to cover all equivalent structures.

We claim:

1. A custom made electric motor with limited end-play, said motor comprising stator means having a hole formed therein and at least one coil associated therewith, said stator being subject to widely varying manufacturing tolerances whereby the thickness of a plurality of said stators vary over a range which is greater than can be accepted, rotor/shaft assembly means passing through said hole in said stator, end caps for providing end-bearing supports for said rotor/shaft assembly means, said end caps being secured to opposite sides of said stator whereby the distance between said end-bearing support is fixed by the thickness of said stator, and a compressible means for fixing an effective length of said rotor/shaft, said compressible means being mounted on at least one end of said rotor/shaft assembly means, said compressible means being compressed with reference to the actual thickness of a specific one stator in order to custom fit the axial length of a specific one rotor/shaft assembly means to match the length of said specific rotor/shaft assembly to the thickness of said specific stator, whereby said specific rotor/shaft and specific stator may be put together to make one custom fitted motor.

2. The motor of claim 1 wherein said motor is a fractional horsepower motor and said stator is a plurality of laminate plates which are secured in a stack whereby variations in the thickness of said stack comprises the total variations of thickness of the individual plates and of the tightness with which said plates are secured together.

3. The motor of claim 1 wherein said compressible means is compressed before an assembly of said rotor/shaft assembly means into said stator with said stator being used as a gage to limit said compression of said compressible means on the rotor/shaft assembly means.

4. The motor of claim 3 wherein said compressible means is a plug which telescopes into an end of said rotor/shaft assembly means by a distance which is fixed by the thickness of said stator.

* * * * *